United States Patent [19]
Dunne et al.

[11] Patent Number: 5,845,091
[45] Date of Patent: *Dec. 1, 1998

[54] FORWARDING OF INTERNETWORK PACKETS TO A DESTINATION NETWORK VIA A SELECTED ONE OF A PLURALITY OF PATHS

[75] Inventors: James W. Dunne, Boston; Igor Lasic, Allston, both of Mass.

[73] Assignee: Bay Networks, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 601,745

[22] Filed: Feb. 15, 1996

[51] Int. Cl.$^6$ .............................. G06F 13/38; G06F 15/17
[52] U.S. Cl. ............................... 395/200.7; 395/200.68; 370/400
[58] Field of Search ...................... 370/351, 401, 370/402, 404, 400; 340/825.03; 395/200.15, 200.09, 200.68, 200.69, 200.7, 200.73, 200.74

[56] References Cited

U.S. PATENT DOCUMENTS

| | | | |
|---|---|---|---|
| 5,088,090 | 2/1992 | Yacoby | 370/85.13 |
| 5,274,631 | 12/1993 | Bhardwaj | 370/60 |
| 5,406,643 | 4/1995 | Burke et al. | 395/200 |
| 5,452,294 | 9/1995 | Natarajan | 370/54 |
| 5,473,599 | 12/1995 | Li et al. | 370/16 |
| 5,504,866 | 4/1996 | Hirasawa | 395/200.16 |
| 5,570,466 | 10/1996 | Oechsle | 395/200.15 |
| 5,583,996 | 12/1996 | Tsuchiya | 395/200.15 |

OTHER PUBLICATIONS

Stallings, Data and Computer Communications, pp. 258–273, Dec. 1988.

*Primary Examiner*—Mark H. Reinhart
*Attorney, Agent, or Firm*—Blakely Sokoloff Taylor & Zafman

[57] ABSTRACT

A method for filtering an internetwork packet wherein multiple paths to a destination network are provided. The method comprises the step of providing a forwarding list that comprises a plurality of entries selected by a user. The forwarding list indicates a plurality of possible paths to a selected destination. One of the entries is selected by the user as a primary entry that indicates a default path. When an internetwork packet is destined for the destination network is received, the packet is forwarded to the destination network via the default path if the primary entry indicates a valid path. Otherwise, the packet is forwarded to the destination network via another path as indicated by another entry. According to an alternative embodiment, a different forwarding list is provided for each subnetwork of a source network, and the forwarding list is selected based on the source address of the packet.

11 Claims, 8 Drawing Sheets

FORWARDING OF INTERNETWORK PACKETS TO A DESTINATION NETWORK VIA A SELECTED ONE OF A PLURALITY OF PATHS

FIELD OF THE INVENTION

The present application relates generally to the filtering and forwarding of internetwork traffic and more particularly to a filter that provides for the selection between one of a plurality of paths to a destination network.

BACKGROUND OF THE INVENTION

A typical digital communications network has a network architecture based upon the Open Systems Interconnection (OSI) Reference Model in order to provide communication between a multiplicity of interconnected digital end systems or "nodes." The OSI Reference Model segments networking protocols into seven layers, which are listed, in ascending order of abstraction, as follows: 1) the physical layer, 2) the data link layer, 3) the network layer, 4) the transport layer, 5) the session layer, 6) the presentation layer, and 7) the application layer.

Internetworking devices such as repeaters, bridges, and routers, each of which operates at a different layer of the OSI Reference Model, are used to interconnect two or more networks so that hosts or "data terminal equipment" (DTE) coupled to the different networks may communicate with one another. Repeaters, also known as "concentrators" and "hubs," operate at the physical layer, which provides the electrical and mechanical interface to the physical medium of the network. Bridges operate at the data link layer, which handles the access to the physical medium of the network. Finally, routers operate at the network layer, which initiates and terminates network connections and manages routing, data sequencing, and error detection and recovery.

Routers are typically provided with a set of traffic filters that are used to determine the manner in which received packets are to be processed and forwarded. Useful traffic-shaping functions are determined by the desired topology of the network. For some purposes, it may be desirable to provide a number of redundant paths to a destination network and to provide the user with the option of prioritizing the selection of redundant paths.

SUMMARY OF THE INVENTION

Therefore, a method for filtering an internetwork packet wherein multiple paths to a destination network are provided is described. The method comprises the step of providing a forwarding list that comprises a plurality of entries selected by a user. The forwarding list indicates a plurality of possible paths to a selected destination. One of the entries is selected by the user as a primary entry that indicates a default path. When an internetwork packet is destined for the destination network is received, the packet is forwarded to the destination network via the default path if the primary entry indicates a valid path. Otherwise, the packet is forwarded to the destination network via another path as indicated by another entry. According to an alternative embodiment, a different forwarding list is provided for each subnetwork of a source network, and the forwarding list is selected based on the source address of the packet.

Other features and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

As described herein, multiple paths are provided between a source network and a destination network, and a router is provided with a traffic filter that allows the user to select the path that traffic to the destination network will follow. According to one embodiment, filtering is performed solely on the basis of the destination address of a packet. If a packet is destined for the destination network, a forwarding list is consulted, and the packet is forwarded as indicated by the forwarding list. According to an alternative embodiment, the source network is subdivided into a multiplicity of subnetworks, and each subnetwork is provided with its own forwarding list. Thus, filtering is performed on the basis of the source address and the destination address of the packet. The filtering table is selected by the user to specify a default path, and the remaining paths are ordered at the preference of the user.

Filtering—Generally

Figure 1:
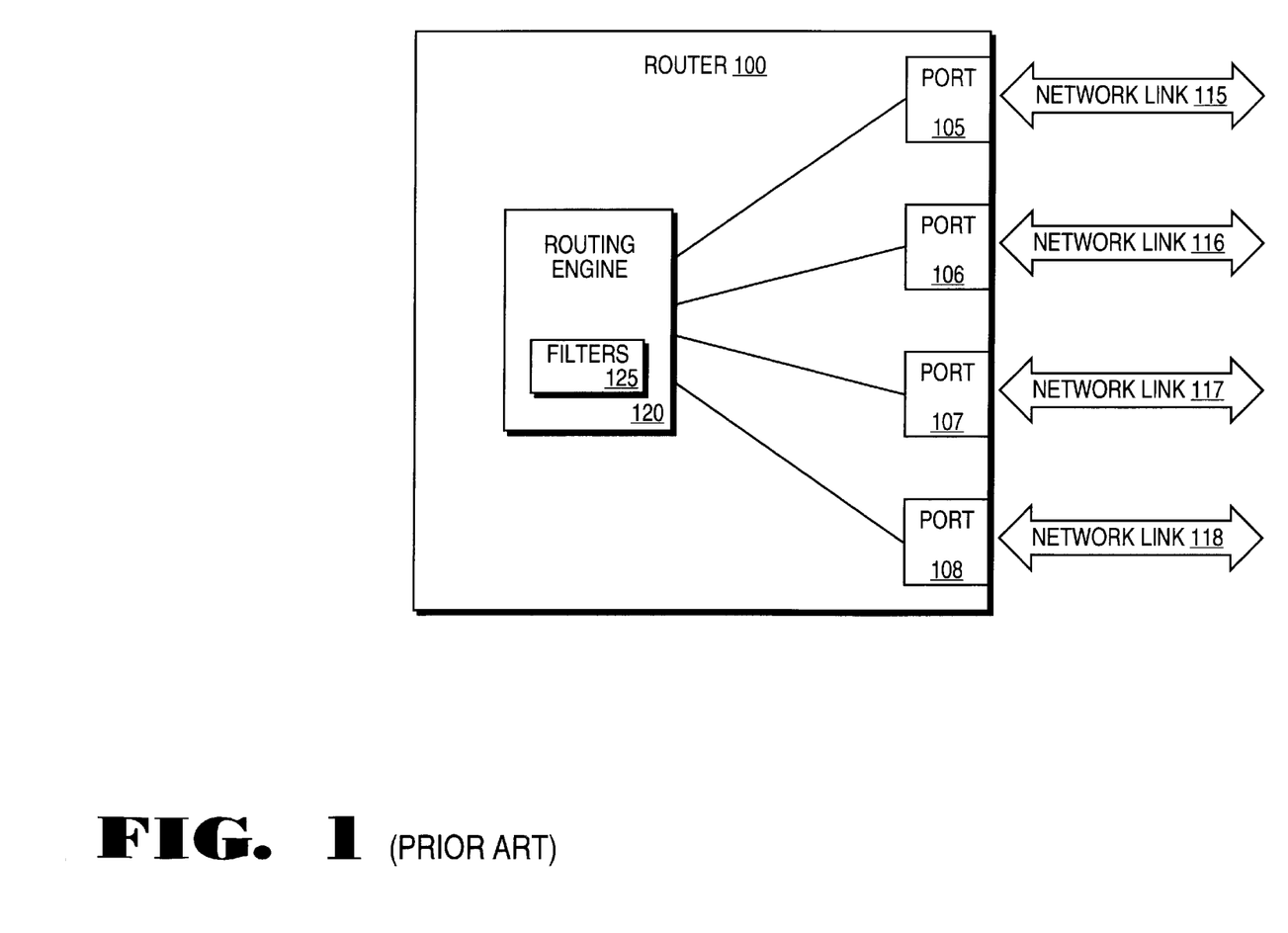
FIG. 1 shows a prior art router that is capable of performing filtering functions.

Prior to discussing the above-mentioned filtering function in detail, traffic filters are generally discussed with respect to prior art FIGS. 1–7. FIG. 1 shows a prior art router that is capable of performing the above-mentioned filtering function. Router 100 generally comprises a plurality of ports 105–108 that are each coupled to a corresponding network link 115–118, respectively. A routing engine 120 is coupled to each of the ports 105–108 for processing and forwarding packets received from the ports using the included filters 125. A routing engine typically comprises a central processing unit (CPU) (not shown), a packet memory, and a system memory wherein the system memory typically stores application programs that provide filtering functions. Thus, filters 125 may actually be software entities stored in the main memory. Alternatively, filters may be provided using hardware.

Figure 2:
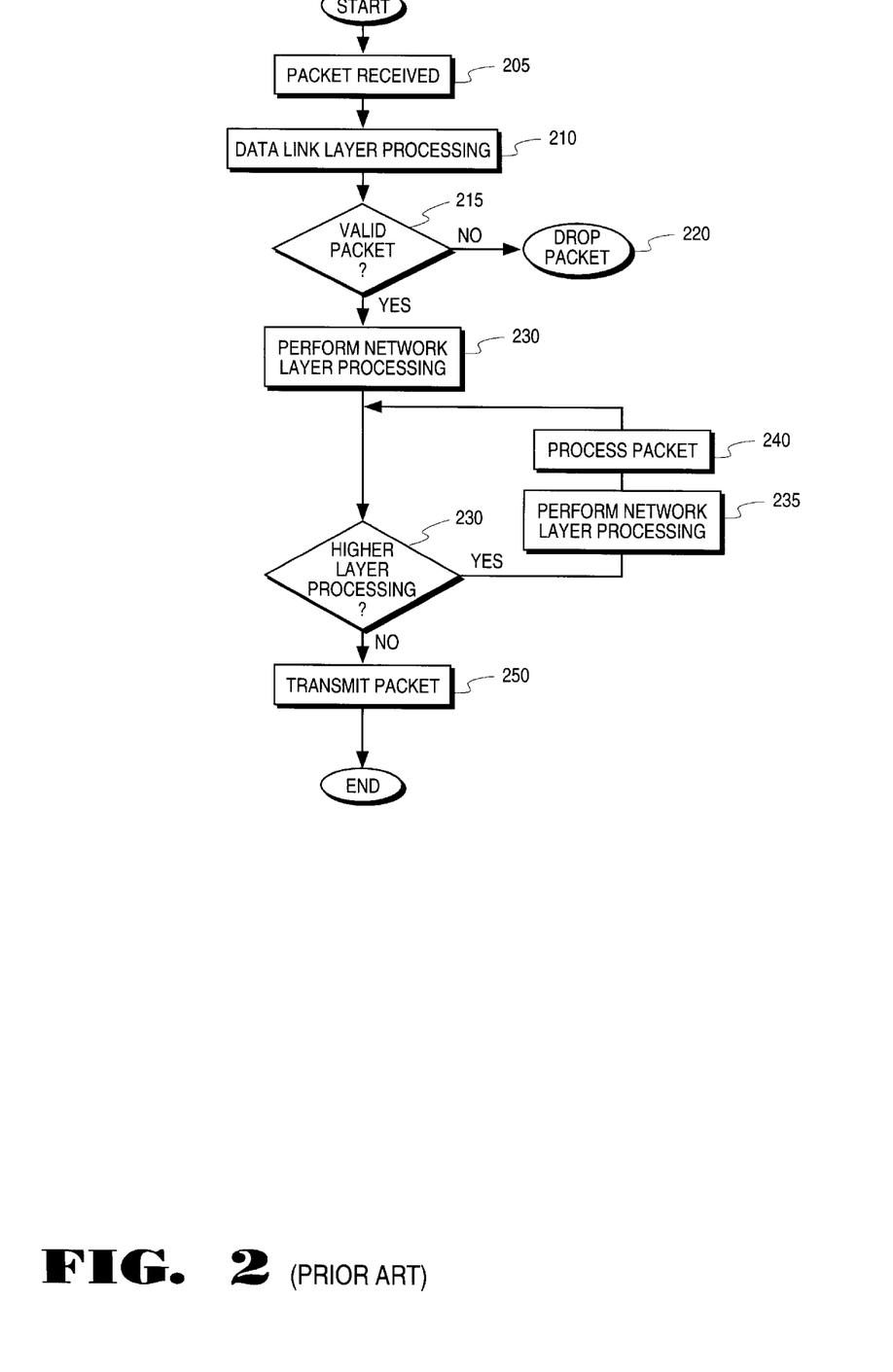
FIG. 2 shows a prior art method for processing and forwarding network packets.

Prior art FIG. 2 shows a basic method for processing and forwarding network packets. In general, the steps of the processing and forwarding are divided roughly along the lines of the seven layer network protocol of the OSI reference model. As is well known, each layer of the seven layer OSI reference model provides information and services to the layer above it. The method in FIG. 2 follows this paradigm.

At process block 205, a package is received from one of the ports. Routing engine 120 stores the packet in the packet memory (not shown) and the CPU (not shown) uses application programs stored in the main memory (not shown) and the filters 125 to perform the processing and forwarding of the packet. At process block 210, datalink layer processing is performed by routing engine 120. If the datalink layer processing determines that the packet is invalid at process block 215, the packet is dropped at process block 220. If the datalink layer processing determines that the packet is valid, network layer processing may proceed at block 225.

Network layer processing is typically performed according to a network layer protocol such as the internet protocol. In addition to IP processing, routing functions such as those provided by RIP and OSPF may also be performed at the network layer. Once network layer processing has been performed it is determined at process block 230 whether higher level processing is to occur. For example, if transport layer processing using the TCP or URP protocols is to occur, the packet is passed on to the software entity that controls TCP or URP processing at process block 235, whereupon the software entity processes the packet at process block 240. If still further higher layer processing, e.g. application layer processing is to occur at process block 230, process steps 235 and 240 are performed by the correspondingly invoked software entity. If higher layer processing is not required at process block 230, the packet may be transmitted at process block 250, whereupon the filtering processing ends. It should be noted that multiple types of actions may be performed by the process of filtering, and transmitting or forwarding the packet is only one of the possible actions. Alternative actions include dropping the packet.

Figure 3:
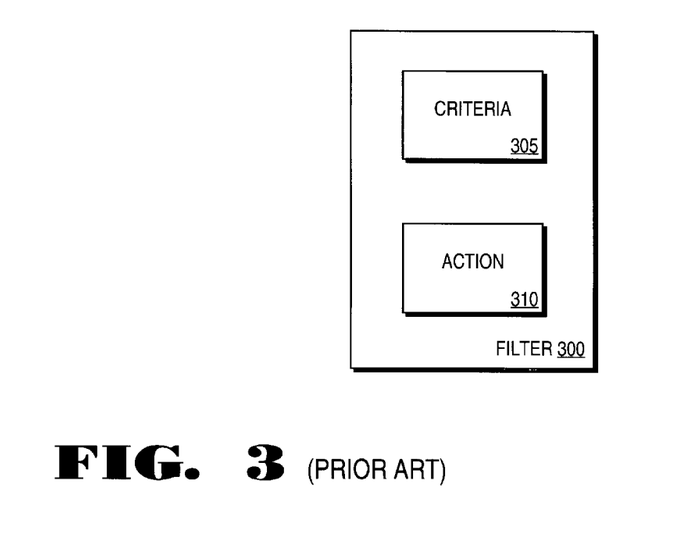
FIG. 3 shows the basic form of a prior art traffic filter.

FIG. 3 shows the basic form of a traffic filter according to the prior art. Filter 300 is shown as generally comprising a set of criteria 305 and a prescribed action 310. The specific traffic filter described herein is performed at the network layer by an IP entity, but traffic filters may be utilized at any one of the seven layers of the OSI reference model in order to provide the desired processing and forwarding of packets. It should be noted that lower layer filtering provides increased granularity in the decision making process. Therefore, to the extent that the functions normally ascribed to a higher layer protocol may be assigned to a protocol that operates the next lower layer, it is desirable to do so.

Figure 4:
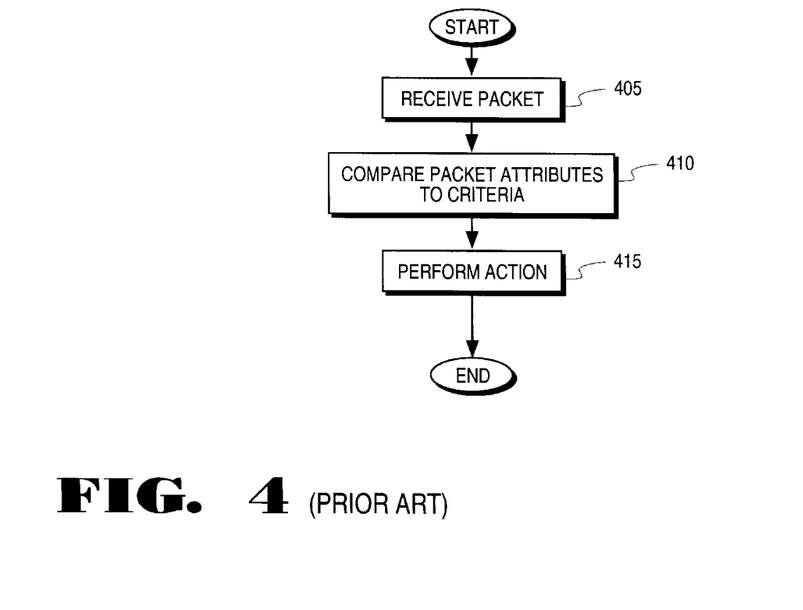
FIG. 4 is a flow chart showing a prior art method for applying a filter to a received packet.

FIG. 4 is a flow chart showing a method for applying a filter to a received packet. The process starts, and the packet is received at process block 405. At process block 410, the routing engine utilizes the filter to compare the attributes of the received packet to the criteria specified by the filter. The criteria used to filter a packet may comprise any attribute of the received packet. For example, common criteria include source IP address, destination IP address, source MAC address, destination MAC address, and source port. Any number of combinations of criteria may be used as any portion of the data packet may be used to define an attribute. For example, a user may require that a predetermined data pattern in the payload of a packet results in a filtering action being performed. Once the attributes of the packet have been compared to the criteria an action is performed at process block 415. The action that is performed is determined by the action required by the filter and the outcome of the comparison between the packet attributes and the criteria. For some cases the failure of the packet to meet the criteria of the filter will result in the packet being dropped. In other cases, failure of the packet to meet the criteria of the filter will allow the packet to be forwarded to its destination. The dropping and forwarding functions are perhaps the simplest functions that may be performed by a filter, and the type of actions that may be performed by filters are quite numerous.

Figure 5:
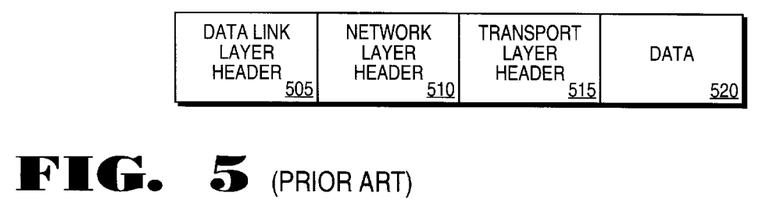
FIG. 5 shows a prior art format for a data packet.
Figure 6:
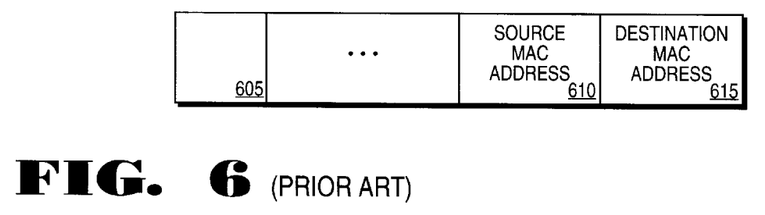
FIG. 6 shows the format of a datalink layer header.
Figure 7:
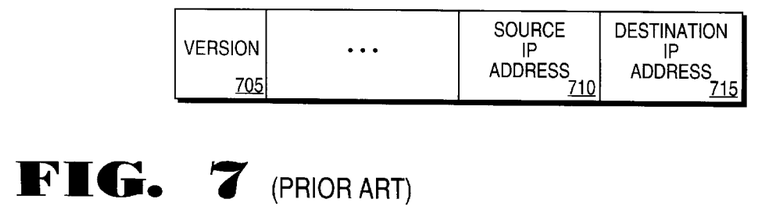
FIG. 7 shows the format of a network layer header

FIGS. 5–7 demonstrate the types of packet attributes that may be used as criteria for performing filtering actions. FIG. 5 generally shows a basic network packet as comprising a datalink layer header 505, a network layer header 510, a transport layer header 515, and the data of the packet 520. All the headers are generically referred to based on the layer to which they correspond because there are multiple types of layer specific protocols. For example, ethernet, Token Ring, and FDDI are examples of datalink layer protocols, and each one includes a Media Access Control (MAC) sublayer protocol that specifies a source address and a destination address. FIG. 6 shows a basic datalink layer header as comprising a multiplicity of fields including a source MAC address 610 and a destination MAC address 615. Similarly, FIG. 7 shows a network layer header as comprising a multiplicity of fields that includes a version field 705, and a source IP address field 710, and a destination IP address 715. The network layer header of FIG. 7 is for a network that implements the IP network layer protocol.

Filtering To Select One of a Plurality of Paths to a Destination Network

Now that the basic functionality of filters have been discussed with respect to FIG. 1–7, the manner in which the above-mentioned filtering function may be achieved is described with respect to FIGS. 8–13. As previously described, it may be desirable to provide multiple paths to the same destination of the network. Alternatively, the network topology may require that there are multiple paths to a destination, and it may be desirable to provide a user with the ability to choose which of the multiple paths to use.

Figure 8:
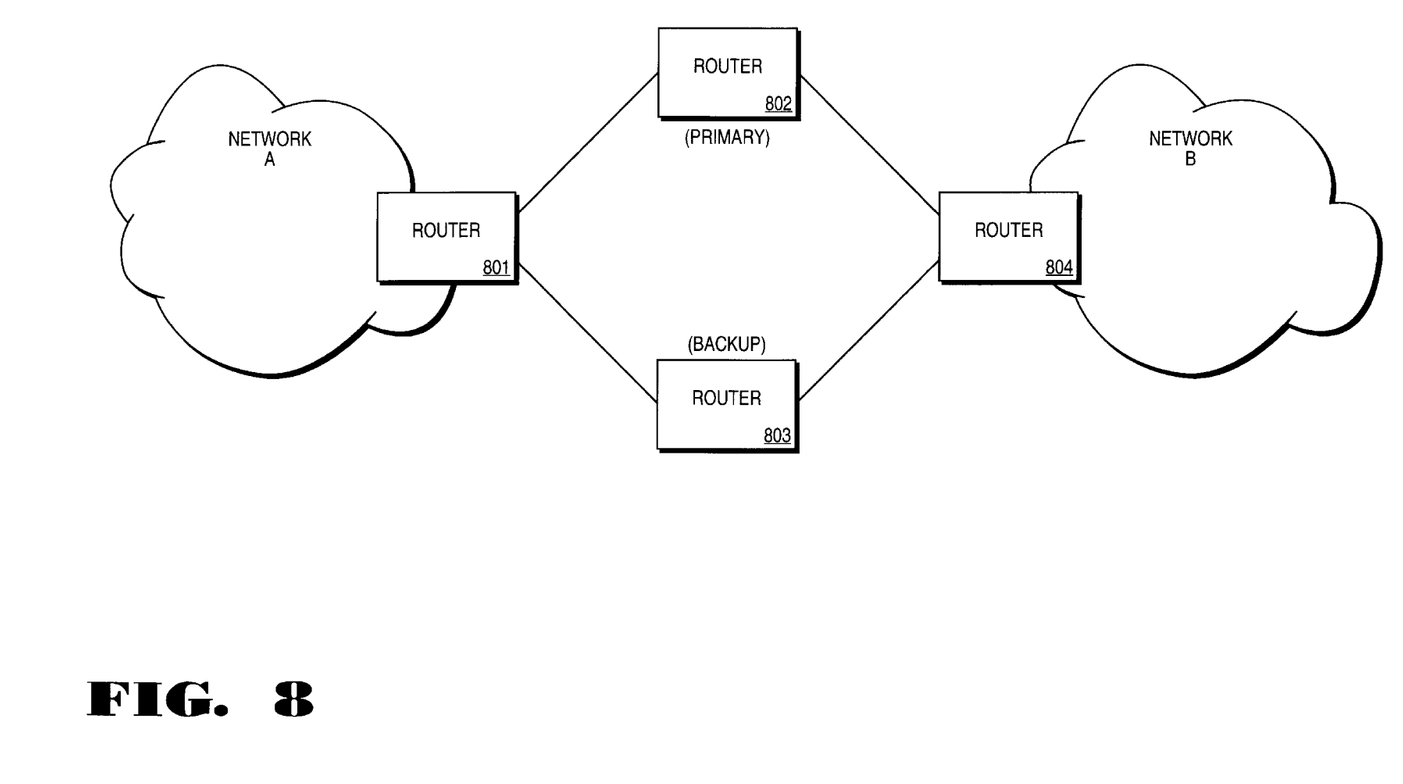
FIG. 8 shows an exemplary network topology of a first embodiment.

FIG. 8 shows a basic internetworking topology wherein multiple paths are provided between network A and network B. Specifically, network A includes a router 801 that includes two ports each coupled to routers that provide paths to network B. According to the present embodiment, router 802 is selected by the user to provide the primary path, and router 803 is selected by the user to provide the backup path to network B. Network B includes a router 804 which also includes two ports for receiving network routed by routers 802 and 803, respectively. In redundancy schemes, only one of the paths is ever selected to transmit data. The purpose of redundancy is to provide fault tolerance should the primary path fail. This may occur for example, should primary router 802 become unavailable for any reason.

According to the present embodiment, router 801 is provided with a traffic filter that ensures that only a user selected one of router 802 and router 803 is used to route packets to network B. According to the basic example, the only criterion required is the destination IP address of network B.

Figure 9:
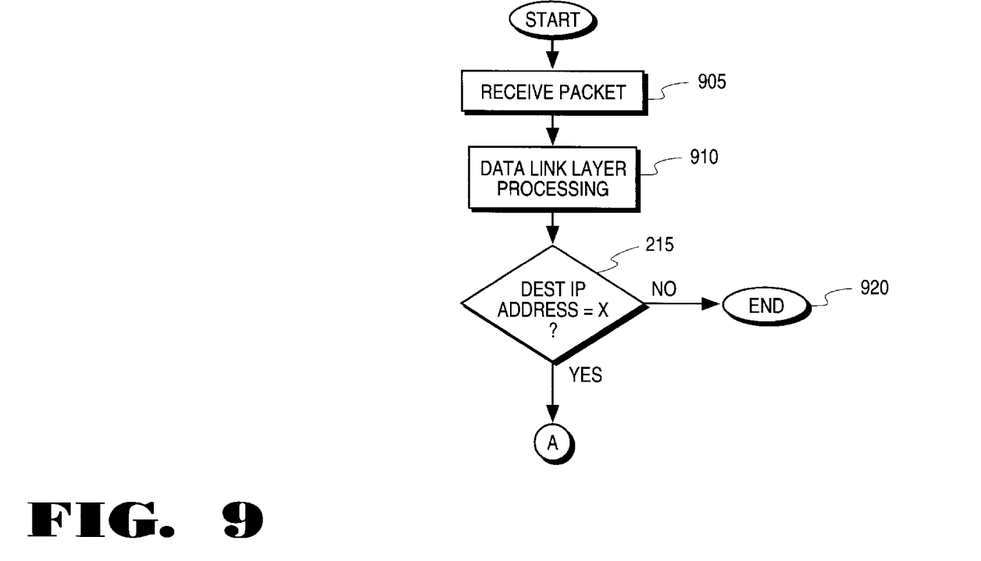
FIG. 9 shows the application of the criteria used by the filter to process a packet.

Thus, FIG. 9 shows the application of the criteria used by the filter to process a packet. At process block 905, router 801 receives a packet, and router 801 performs the datalink layer processing at process block 910. The criteria applied to the data packet is basically shown at process block 915, wherein router 801 determines whether the destination IP address is equal to the destination IP address of network B. If the received packet includes a destination IP address that is not that of network B, the process of the filter ends at process block 920, otherwise the filtering function is performed at step A, which is continued in FIG. 10.

Figure 10:
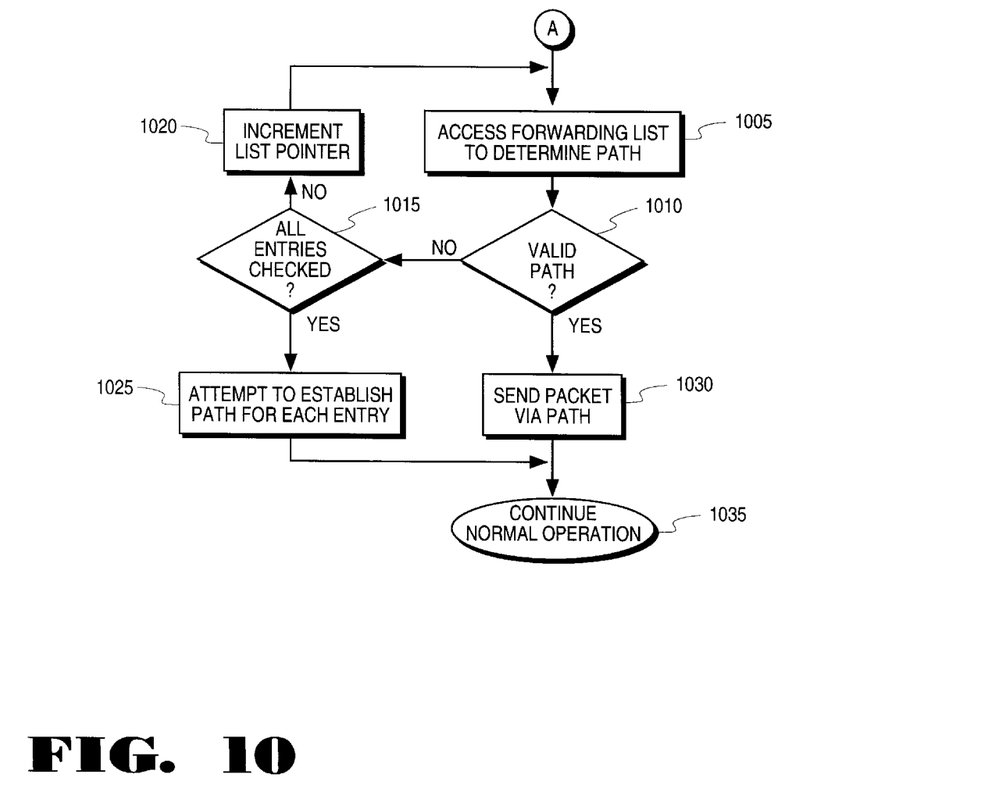
FIG. 10 shows a filtering and forwarding method for the first embodiment.

According to the present embodiment, a forwarding list associated with network B is maintained in router 801. At process block 1005, the routing engine accesses the forwarding list to determine which path the received packet is to be transmitted over. At process block 1010, the routing engine determines whether the primary path indicated by the list pointer is currently valid. If the primary path is currently valid, the packet is sent via the primary path at process block 1015. If the primary path is not valid, it is determined whether all entries of the forwarding list have been checked for validity, and if they have not, the list pointer is incremented at process block 1020 and is determined whether process steps 1005 and 1010 are repeated. If all entries of the forwarding list have been checked for validity and found to be invalid, the routing engine of router 801 attempts to reestablish the path indicated by each entry of the forwarding list. This may be done, for example, by transmitting an ARP request to each of the routers indicated by the forwarding list.

Providing the ability to select one of a plurality of paths to a single destination at the network layer of the OSI reference model results a number of advantages. First, redundancy may be provided without also providing a complicated routing protocol and associated software entity such as RIP or OSPF. Furthermore, the user is provided the option of selecting which path to use. Routing protocols such as OSPF and RIP operate such that routers determine among each other automatically which path is the best path based on certain criteria that are typically based on cost or performance. The filtering function described herein provides the user with the ability to forcefully set the path without regard to such criteria.

Figure 11:
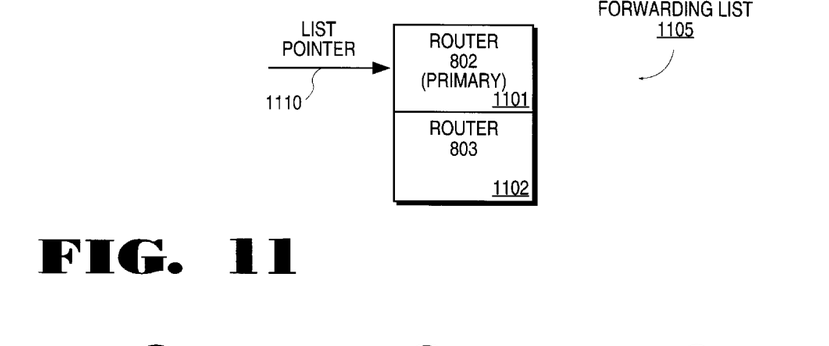
FIG. 11 shows an exemplary forwarding list.

FIG. 11 shows an example of a forwarding list that may be implemented by router 801 of FIG. 8. Specifically, forwarding list 1105 is shown as including two entries, one corresponding to router 802 and the other corresponding to router 803. As indicated, the first position of the list is designated as the primary position, and list pointer 1110 automatically points to entry 1101 which contains information regarding router 802. It should be noted that the forwarding list is reset for each packet as it is processed such that, should the primary router be unavailable during a processing of a first packet and become subsequently available during the processing of a second packet, the primary path will automatically be selected. The forwarding list is programmable such that the user may define the order of the entries and therefore the order in which the entries are tested for validity.

Figure 12:
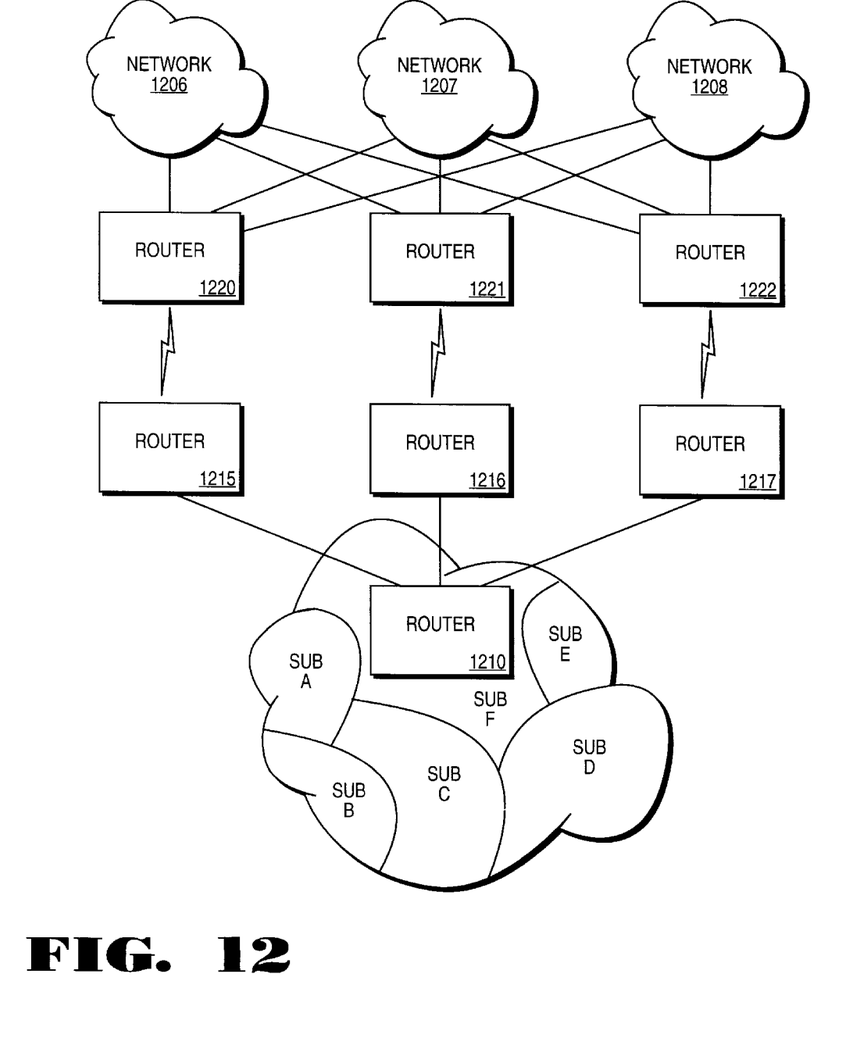
FIG. 12 shows an alternative network topology of a second embodiment wherein the source network is subdivided into a plurality of subnetworks.

FIG. 12 shows a more complicated example of the use of the current filtering function. Specifically, FIG. 12 shows a network 1205 that it is divided into a multiplicity of subnetworks A–F, each of which has its own unique IP address. Router 1210 is shown as being coupled to each of routers 1215–1217. Router 1215 is coupled to router 1220, router 1216 is coupled to router 1221, and router 1217 is coupled to router 1222. Each of routers 1220–1222 are shown as being connected to each of networks 1206–1208. For the example of FIG. 12, assume that the internetwork 1200 is being used to route calls from network 1205 to any one of networks 1206–1208. Further assume that network 1205 is physically located in the United States and that each of networks 1206–1208 are located in a different portion of the world. Finally, assume that the connections defined between router 1215 and 1220, 1216 and 1221, and 1217–1222 are each controlled by a different long distance telephone service provider.

By expanding the criteria of the described function to include the source IP address, a forwarding list may be separately defined for each of the subnetworks A–F of network 1205. For example, subnetwork A may desire to have the connection defined by router 1215 as its primary connection followed in order by the connections of routers 1216 and 1217. Similarly, the subnetwork C may define a forwarding list wherein its selects router 1216 to provide the primary connection and routers 1217 and 1215 (in that order) as its backups.

Figure 13:
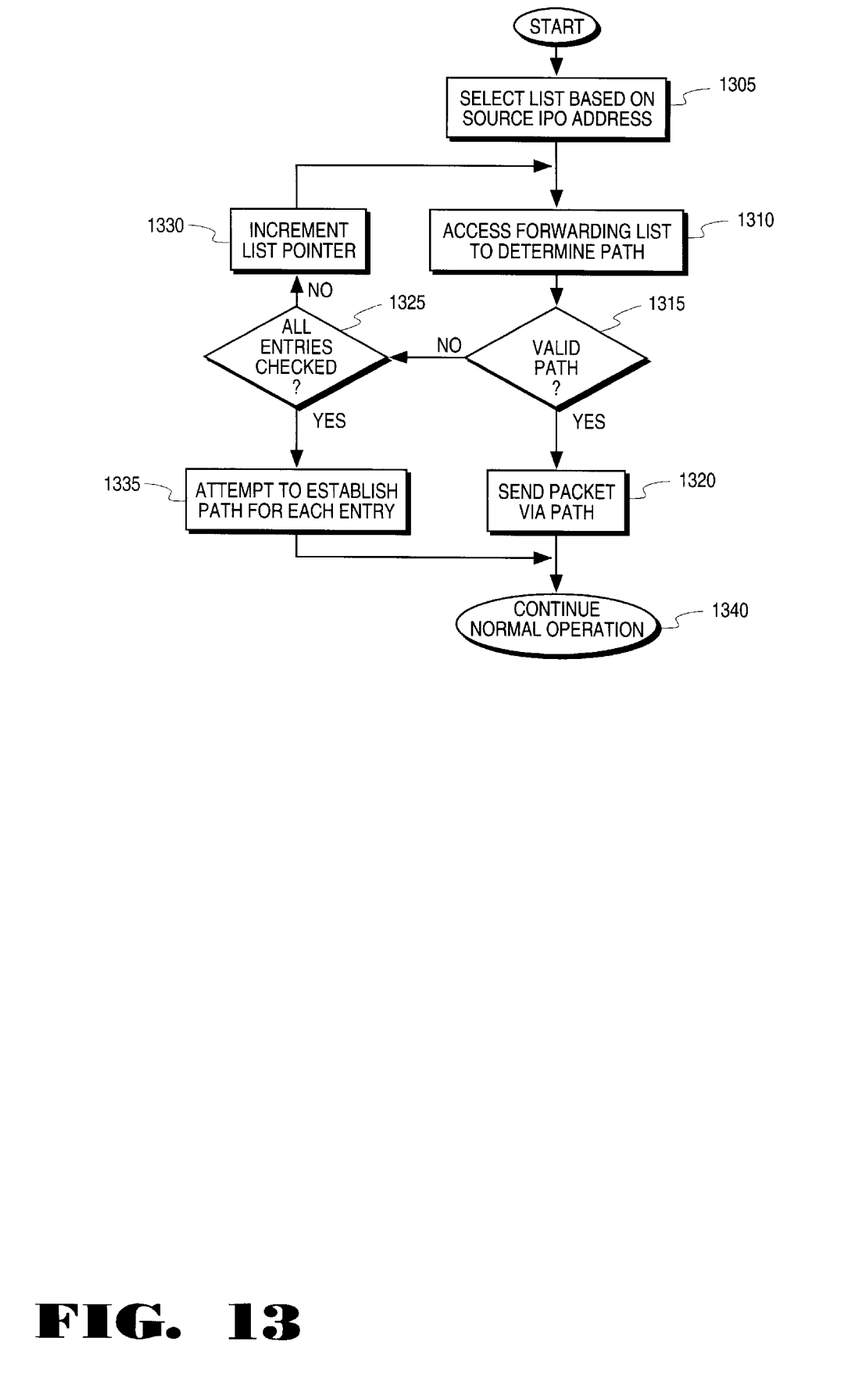
FIG. 13 show a filtering and forwarding method of the second embodiment.

FIG. 13 shows a method that may be used to process data packets received from a multiplicity of subnetworks such that each subnetwork is transmitted to their destination according to the priorities specified by the forwarding list of each subnetwork. At process block 1315, the routing engine selects a list based on the source IP address of the received packet. Process blocks 1310–1340 are substantially identical to process blocks 1005–1030, as described with respect to FIG. 10.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for filtering an internetwork packet comprising:

providing a forwarding list that includes a plurality of entries that each specify a possible path to a destination wherein a first entry specifies a default path to the destination, said list is user programmable to prioritize entries;

receiving a packet that is destined for the destination;

forwarding the packet to the destination via the default path if the first entry indicates a valid path; and forwarding the packet to the selected destination via another path as indicated by another entry if the entry indicates an invalid path; and automatically resetting said first entry as said default path for a second packet.

2. The method of claim 1, wherein the forwarding list includes a mechanism that allows a user to prioritize said entries of the list, the method including the initial step of a user specifying which entry of the forwarding list is the first entry.

3. The method of claim 1, wherein the forwarding list includes a list pointer that initially points to the first entry, the step of forwarding the packet via another path comprising:

incrementing the list pointer to point to a second entry;

determining whether a second path indicated by the second entry is valid; and forwarding the packet to the destination by the second path if the second path is valid.

4. The method of claim 1, further comprising the step of attempting to establish a path for each entry of the forwarding list if all paths are indicated as invalid.

5. A router comprising:

a plurality of ports for coupling to a plurality of networks;

a routing engine coupled to the ports for processing packets received from the plurality of ports, the routing engine including a forwarding list including a plurality of entries that each specify a possible path to a destination and a filter that, when a packet destined for a destination is received, selects one of a plurality of possible paths to the destination by consulting the forwarding list, the forwarding list is user programmable to identify a first entry as a default path which the filter selects if the default path is valid, said filter forwards the packet via a second path if the default path indicates an invalid path, said filter automatically resets said first entry as said default path for a second packet.

6. The router of claim 5 wherein the forwarding list includes a list pointer that is incremented through the plurality of entries until a valid path is found, the user defining an order of the plurality of entries.

7. A method for filtering an internetwork packet comprising providing a network that includes a plurality of subnetworks;

for each subnetwork, providing a separate forwarding list that includes
 a plurality of entries that each specify a possible path to a destination wherein a first entry specifies a default path to the destination;

receiving a packet from a subnetwork that is destined for the destination;

selecting the forwarding list of the respective subnetwork, based on the source address of the packet;

forwarding the packet to the destination via the default path if the first entry indicates a valid path;

forwarding the packet to the selected destination via another path as indicated by another entry if the if entry indicates an invalid path; and automatically resetting said first entry as said default path for a second packet.

8. The method of claim 7, wherein each forwarding list includes a mechanism that allows a user to specify the first entry, the method including the initial step of a user specifying which entry of the forwarding list is the first entry.

9. A router comprising:

a plurality of ports for coupling to a plurality of networks including a first network having a plurality of subnetworks;

a routing engine coupled to the ports for processing packets received from the plurality of ports, the routing engine including a plurality of separate forwarding lists corresponding respectively to each of the plurality of subnetworks, each forwarding list including a plurality of entries specifying a possible path to a destination and a filter that, when a packet destined for a destination is received, selects a forwarding list based on a source address of the packet, said filter forwards the packet to a destination via a default path if a first entry indicates a valid path, said filter forwards the packet via a second path if the default path indicates an invalid path, said filter automatically resets said first entry as said default path for a second packet.

10. The router of claim 9 wherein each forwarding list is programmable by a user such that the user selects a default path which the filter selects if the default path is valid.

11. The router of claim 10 wherein each forwarding list includes a list pointer that is incremented through the plurality of entries until a valid path is found, the user defining an order of the plurality of entries.

* * * * *